(12) United States Patent
Sugimoto (10) Patent No.: US 8,505,346 B2
(45) Date of Patent: Aug. 13, 2013

(54) ELECTRIC STEERING LOCK DEVICE

(75) Inventor: Koichiro Sugimoto, Kanagawa (JP)

(73) Assignee: Alpha Corporation, Yokohama-shi, Kanagawa-Ken (JP)

( * ) Notice: Subject to any disclaimer, the term of this patent is extended or adjusted under 35 U.S.C. 154(b) by 493 days.

(21) Appl. No.: 12/085,630

(22) PCT Filed: Nov. 21, 2006

(86) PCT No.: PCT/JP2006/323188
§ 371 (c)(1),
(2), (4) Date: May 28, 2008

(87) PCT Pub. No.: WO2007/063743
PCT Pub. Date: Jun. 7, 2007

(65) Prior Publication Data
US 2009/0165510 A1    Jul. 2, 2009

(30) Foreign Application Priority Data
Nov. 30, 2005   (JP) ................................. 2005-346236

(51) Int. Cl.
*B60R 25/02*   (2013.01)
(52) U.S. Cl.
USPC .............................................. 70/252; 70/186
(58) Field of Classification Search
USPC .......................................... 70/182–186, 252
See application file for complete search history.

(56) References Cited

U.S. PATENT DOCUMENTS

| | | | | |
|---|---|---|---|---|
| 3,629,818 | A * | 12/1971 | Hirama et al. | 70/252 |
| 4,638,882 | A * | 1/1987 | Sato | 70/252 |
| 4,643,009 | A * | 2/1987 | Sato | 70/252 |
| 6,233,986 | B1 * | 5/2001 | Suzuki et al. | 70/186 |
| 6,952,059 | B1 * | 10/2005 | Louvel et al. | 307/9.1 |
| 7,007,525 | B2 * | 3/2006 | Okuno et al. | 70/186 |

(Continued)

FOREIGN PATENT DOCUMENTS

| | | |
|---|---|---|
| EP | 1 176 065 A2 | 1/2002 |
| JP | 59-014562 | 1/1984 |

(Continued)

OTHER PUBLICATIONS

Extended European Search Report issued Jul. 23, 2010, in counterpart European Application No. 06833038.0.

(Continued)

*Primary Examiner* — Christopher Boswell
(74) *Attorney, Agent, or Firm* — Nath, Goldberg & Meyer; Jerald L. Meyer; Stanley N. Protigal (57) ABSTRACT

An electric steering lock device includes a worm wheel (8) that is rotated, in an unlock direction and a lock direction by the drive of a motor (6), a first cam member (9) and a second cam member (10) that are disposed in the worm wheel (8), a lock member (11) that follows the first cam member (9) and shifts between a lock position and an unlock position, and a holding lever (12) that follows the second cam member (10) and shifts between a standby position and a holding position. A detected part (24) is disposed in the first cam member (9), and first and second position sensors (S1, S2) that regard the detected part (24) as a detection target are disposed. The detection outputs of the first position sensor (S1) and the second position sensor (S2) detect the lock position and the unlock position of the lock member (11).

5 Claims, 12 Drawing Sheets

(56) References Cited

U.S. PATENT DOCUMENTS

| | | | |
|---|---|---|---|
| 7,021,093 B2 * | 4/2006 | Fukatsu et al. | 70/186 |
| 7,140,213 B2 * | 11/2006 | Feucht et al. | 70/186 |
| 7,151,324 B2 * | 12/2006 | Neuhoff et al. | 70/186 |
| 7,596,976 B2 * | 10/2009 | Sugimoto | 70/186 |
| 7,856,858 B2 * | 12/2010 | Laval et al. | 70/186 |
| 8,424,348 B2 * | 4/2013 | Dimig et al. | 70/186 |
| 2005/0183476 A1 * | 8/2005 | Feucht et al. | 70/186 |
| 2006/0169010 A1 * | 8/2006 | Limburg | 70/186 |
| 2006/0169011 A1 * | 8/2006 | Limburg | 70/186 |
| 2008/0202275 A1 * | 8/2008 | Rouleau et al. | 74/493 |

FOREIGN PATENT DOCUMENTS

| | | |
|---|---|---|
| JP | 2005-014755 | 1/2005 |
| JP | 2005-319866 | 11/2005 |
| WO | 2004/098960 A1 | 11/2004 |

OTHER PUBLICATIONS

European Office Action issued on Oct. 11, 2012, in the counterpart European Application.

* cited by examiner

ELECTRIC STEERING LOCK DEVICE

TECHNICAL FIELD

The present invention relates to an electric steering lock device that locks rotation of a steering shaft of automobiles.

BACKGROUND ART

Figure 1:
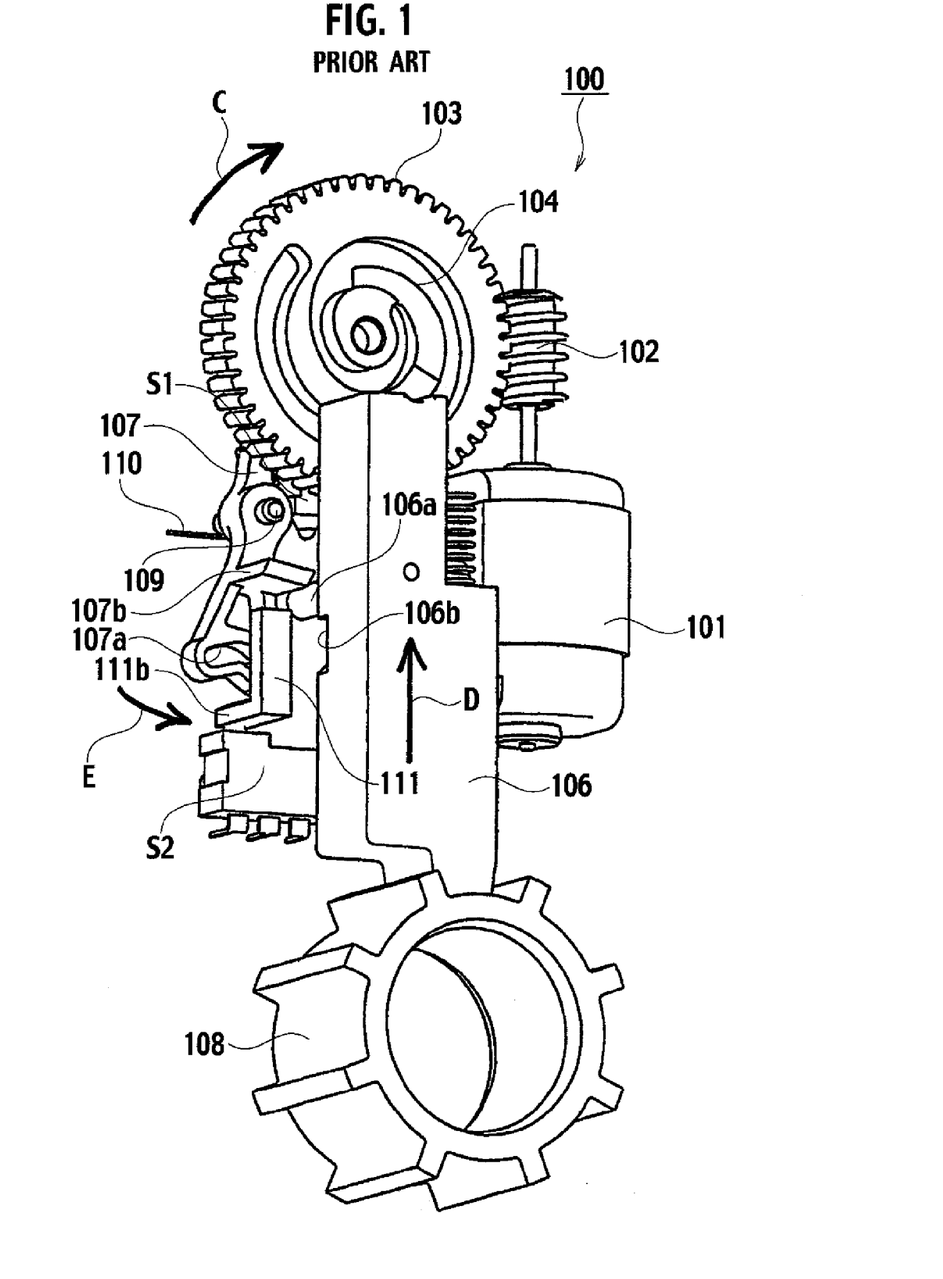
FIG. 1 is, a perspective view of a related electric steering lock device.
Figure 2:
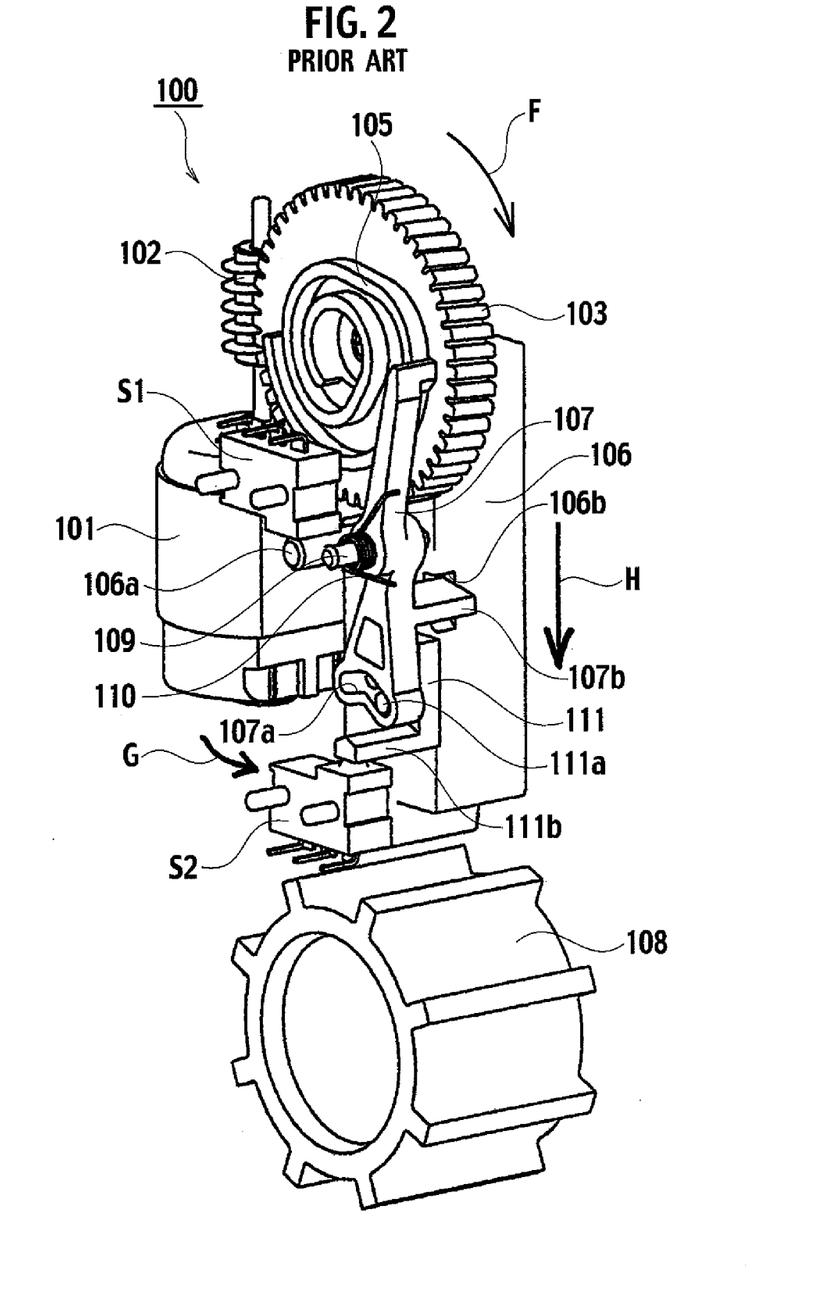
FIG. 2 is a perspective view of the related electric steering lock device viewed from a face side opposite to FIG. 1.

As a related art, International Patent Publication No. WO2004/098960A1 discloses an electric steering lock device. As shown in FIGS. 1 and 2, an electric steering lock device 100 includes: a worm gear 102 fixed to the rotational shaft of a motor 101; a worm wheel 103 engaged with the worm gear 102 and rotatably supported; a first cam member 104 integrally disposed on one side of the worm wheel 103; a second cam member 105 integrally disposed on the other side of the worm wheel 103; a lock member 106 following the first cam member 104 to move up and down; and a holding lever 107 following the second cam member 105 to oscillate.

The lock member 106 is shifted between a lock position (position of FIG. 1) preventing the rotation of a steering shaft 108 and an unlock position (position of FIG. 2) allowing the steering shaft 108 to rotate. A detection pin 106a protrudes from the lock member 106. A first position sensor S1 is placed on the movement orbit of the detection pin 106a. The first position sensor S1 outputs an ON signal when the lock member 106 is positioned at the lock position.

The holding lever 107 oscillates about a rotation pivot 109 between a standby position (position of FIG. 1) allowing the lock member 106 to move and a holding position (position of FIG. 2) preventing the movement of the lock member 106 to the lock position side. On the rotation pivot 109, a spring 110 is held that urges the holding lever 107 to the holding position side. In the lower end of the holding lever 107 is formed a "V" shaped hole 107a and in the hole 107a is inserted a pin 111a of a detection block 111. The detection block 111 is disposed to be movable in the up and down directions, and is moved upward and downward by the oscillation of the holding lever 107. A detection pin 111b protrudes from the lower end of the detection block 111, and a second position sensor S2 is placed on the upward and downward movement orbit of the detection pin 111b. The second position sensor S2 outputs an ON signal when the lock member 106 positions at the lock position and at the unlock position, and outputs an OFF signals when the lock member 106 positions at other positions.

In the above configuration, as illustrated in FIG. 1, the lock member 106 is supposed to be positioned at the lock position. In this state, the driver or the like presses a steering lock-unlock button (not shown) in order to drive a vehicle. Then the worm wheel 103 is rotated in an unlock direction C by driving the motor 101 and the lock member 106 follows the first cam member 104 to move in an unlock position direction D. Thereafter, as shown in FIG. 2, the lock member 106 moves to the unlock position, the holding lever 107 also follows the second cam member 105 to move in a holding position direction E, and then a latch fragment 107b of the holding lever 107 is inserted in a latch concave part 106b of the lock member 106. Then, although the output of the first position sensor S1 maintains an OFF signal state, the output of the second position sensor S2 changes from an OFF signal to an ON signal. This signal change stops the driving of the motor 101 and then the lock member 106 stops at the unlock position of FIG. 2. When the lock member 106 positions at the unlock position, the steering shaft 108 freely rotates. Since the position of the lock member 106 is held by the holding lever 107, the lock member 106 does not move to the lock position side even when a strong impact force is applied to the lock member 106. This securely prevents a situation in which the steering shaft 108 is locked during the traveling of the vehicle, or the like.

On the other hand, in the above configuration, as illustrated in FIG. 2, the lock member 106 is supposed to be positioned at the unlock position. In this state, the driver or the like presses the steering lock-unlock button (not shown) for the parking of the vehicle, or the like. Then, the worm wheel 103 is rotated in an lock direction F by driving the motor 101 and the holding lever 107 follows the second cam member 105 to move in a standby position direction G and also the lock member 106 follows the first cam member 104 to move in a lock position direction H. Thereafter, as shown in, FIG. 1, when the lock member 106 moves to the lock position, the output of the first position sensor S1 changes from an OFF signal to an ON signal, and the output of the second position sensor S2 also changes from an OFF signal to an ON signal. This signal change stops the driving of the motor 101 and then the lock member 106 stops at the lock position. When the lock member 106 positions at the lock position, the rotation of the steering shaft 108 is locked. This can prevent vehicle robbery while the vehicle is parked.

DISCLOSURE OF THE INVENTION

However, the related electric steering lock device 100 causes the first and second sensors S1 and S2 to detect the position of the lock member 106 and the position of the holding lever 107 holding the lock member 106 at the unlock position to thereby detect the lock position of the lock member 106 and the unlock position.

Thus, if the cam face of the first cam member 104 is divided into a lock position (lower dead point) area, an unlock position (upper dead point) area and an up and down area therebetween, the entrance point of the lock position (lower dead point) area or the unlock position (upper dead point) area becomes the lock position or the unlock position. Thus, a position at which the first cam member 104 has a large strength or the motor 101 has advantageous start-up torque, or the like, cannot be selected as the lock position or unlock position.

In addition, the first position sensor S1 and the second position sensor S2 need to be positioned at separate positions. Therefore, this becomes a factor of preventing the compactification of a device.

The present invention has been made to solve the problems of the above described related art and its object is to provide an electric steering lock device that can stop the lock member at a desired contact position of the lock position area or the unlock position area of the first cam member and also enables the device to be compactified.

In order to achieve the above-described object, an aspect of the present invention is an electric steering lock device, comprising: a driving source; a rotator configured to rotate by a drive of the driving source in an unlock direction and in a lock direction, the rotator including a first cam member and a second cam member, the first cam member having a first detected part; a lock member configured to follow the first cam member and shift between a lock position and an unlock position, the lock member being configured to prevent a rotation of a steering shaft at the lock position and allow a rotation of the steering shaft at the unlock position; a holding lever configured to follow the second cam member and oscillate between a standby position and a release position, the holding lever being configured to allow a movement of the lock member at the standby position and prevent a movement of the lock member to the lock position at the holding position, the holding lever being configured to position at the standby position when the lock member positions at a position other than the unlock position and position at the holding position when the lock member positions at the unlock position; and a first position sensor and a second position sensor regarding the first detected part as a detecting target, wherein if the lock member positions at the lock position or at the unlock position is detected with detection outputs of the first position sensor and the second position sensor.

According to the above aspect of the present invention, if the cam face of the first cam member is divided into a lock position area that makes a lock member be positioned at a lock position, an unlock position area that makes it be positioned at an unlock position and an up and down area therebetween, the lock member can be positioned at desired contact positions of the lock position area and the unlock area. Hence, a lock member can be stopped at a position in consideration of a stable stroke of a lock member, the strength of the first cam member, load torque at startup of a driving source, and the like.

Additionally, the disposition of a detected part for detecting a lock position and an unlock position in the first cam member enables the first position sensor and the second position sensor to be positioned in adjacent positions, thereby being capable of compactifying the device.

Further, the holding lever may have a second detected part, and the electric steering lock device may further comprise: a third position sensor regarding the second detected part as a detection target, wherein if the holding lever positions at the holding position or at the standby position is detected with a detection result of the third position sensor.

According to the above configuration, the first and second position sensors detect the position of the lock member and the third position sensor also detects the position of the holding member. Accordingly, unusual situations can be detected in which the holding member positions at the holding position even though the lock member does not position at the unlock position, or in which, although the lock member positions at the unlock position, the holding member does not position at the holding position. This makes it possible to detect unusual actions of an electric steering lock device in detail.

Further, the lock member and the holding member may be placed in a vicinity of the rotator and placed in mutually adjacent positions.

According to the above configuration, the lock member and the holding lever can be placed using a small space and this contributes to compactification of the device.

Further, the first detected part and the second detected part may be both placed in mutually adjacent positions, and the first position sensor, the second position sensor and the third position sensor may be disposed in a same circuit substrate.

According to the above configuration, the first to the third position sensors are readily installed. Since three position sensors can be placed in a small space, the device can be compactified.

Further, the electric steering lock device may further comprise: a first spring configured to urge the lock member in a direction in which the lock member is pressed to the first cam member, and a second spring configured to urge the holding lever in a direction in which the holding lever is pressed to the second cam member.

According to the above configuration, if the lock member and the holding lever are simply made contact with the first cam member and the second cam member, respectively, the lock member and the holding lever move following the first cam member and the second cam member by each spring force, whereby the structure of the first cam member and the second cam member can be simplified.

BEST MODE FOR CARRYING OUT THE INVENTION

Figure 3:
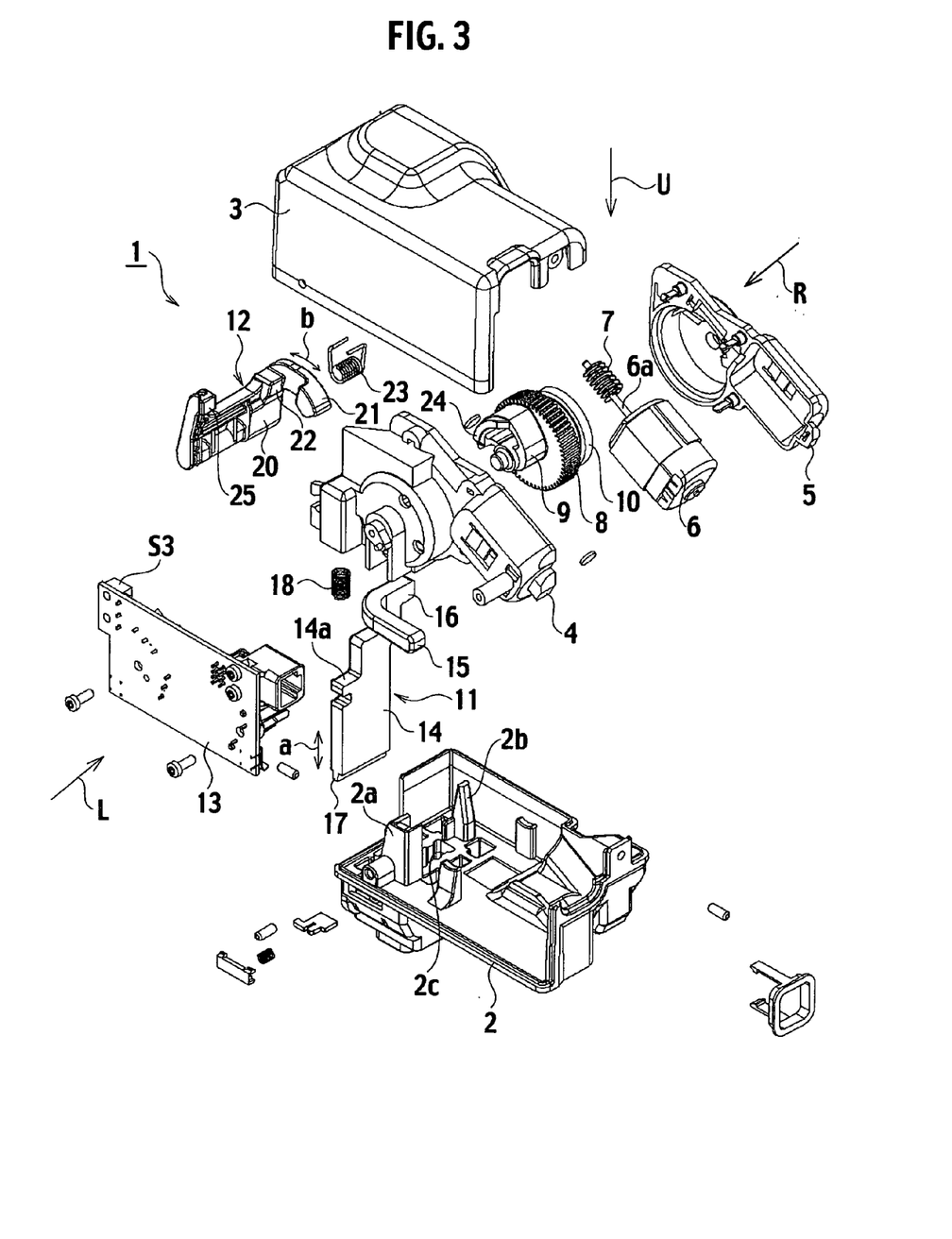
FIG. 3 is an exploded perspective view of an electric steering lock device according to an embodiment of the present invention.
Figure 4:
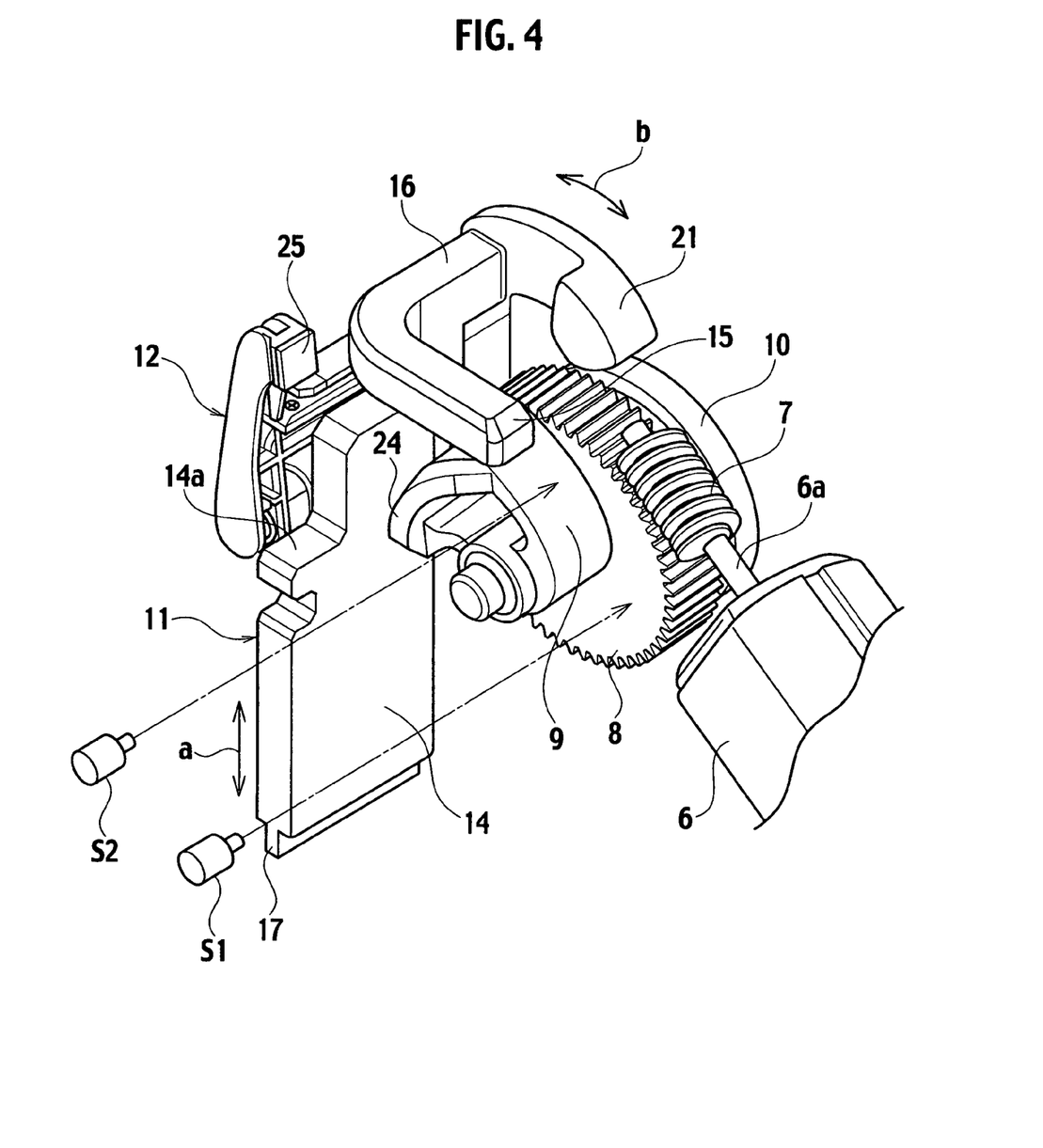
FIG. 4 is a perspective view of a main part of an action site of an electric steering lock device according to an embodiment of the present invention.
Figure 5:
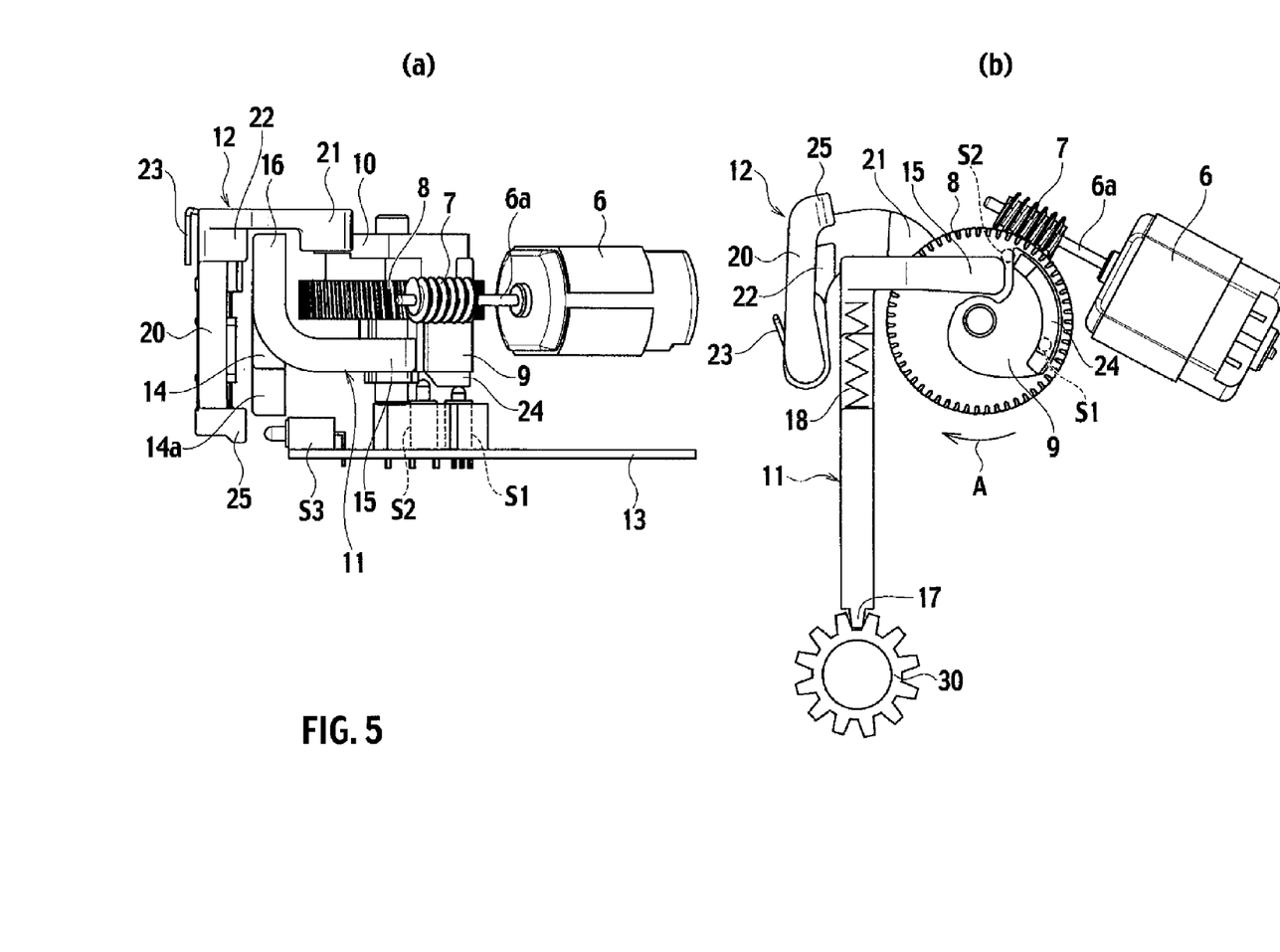
FIG. 5(a) is an action depiction diagram viewed in the U arrow direction of an electric steering lock device according to an embodiment of the present invention.
FIG. 5(b) is an action depiction diagram viewed in the L arrow direction of an electric steering lock device according to an embodiment of the present invention.

One embodiment of the present invention will be set forth below with reference to the drawings. In the depiction of the drawings below, the same or like parts will have the same or like reference numerals. However, note that the drawing is schematic and the relation between a thickness and a plane size, ratio of the thicknesses of each of the layers, and the like are different from actual ones. In FIGS. 3 to 12, one embodiment of the present invention is illustrated. FIG. 3 is an exploded perspective view of an electric steering lock device 1. FIG. 4 is a perspective view of a main part of an action site of the electric steering lock device 1. Each of FIGS. 5(a) and 5(b) to FIGS. 12(a) and 12(b) is an action depiction diagram.

The electric steering lock device 1 includes, as illustrated in FIG. 3, as primary structure members a housing 2 and a cover 3 that are put together and form therein a parts accommodating room, a drive unit housing 4 and a drive unit cover 5 that are accommodated in the parts accommodating room and further form therein a drive unit room, a motor 6 that is placed in the drive unit room and serves as a driving source, a worm gear 7 that is fixed to a rotation axis 6a of the motor 6, a worm wheel 8 that is engaged with the worm gear 7, rotatably supported within the drive unit room, a first cam member 9 that is integrally disposed on one side of the worm wheel 8, a second cam member 10 that is integrally disposed on the other side of the worm wheel 8, a lock member 11 that follows the first cam member 10 and moves up and down in the a arrow direction, a holding lever 12 that follows the second cam member 10 and oscillates in the b arrow direction, and a rotation substrate 13 that is placed in the parts accommodating room.

The lock member 11 includes, as illustrated in FIG. 4 in detail, a flat rod part 14 that is flat planar and has formed therein a spring receiving face 14a by notching, a cam latch part 15 that is protruded from above the flat rod part 14 in the horizontal direction, a lever latch protrusion 16 that is protruded to the opposite side of the cam latch part 15, and a shaft latch protrusion 17 that is disposed in the lower end of the flat rod part 14. The flat rod part 14 is up and down movably supported by a pair of guide rail parts 2a, 2b of the housing 2. The lock member 11 has the shaft latch protrusion 17 protruded out of a hole 2c of the housing 2 and is shifted between a lock position preventing the rotation of a steering shaft 30 (a position of each of (a) and (b) of FIGS. 5 and 9) and an unlock position allowing the steering shaft 30 to rotate (apposition of each of (a) and (b) of FIGS. 8 and 12). A compression spring 18 serving as a first spring is intervened between the spring receiving face 14a and the drive unit housing 4 and the lock member 11 is urged by the spring force of the compression spring 18 in a direction in which the lock member 11 presses the first cam member 9.

The holding lever 12 includes, as indicated in FIG. 4 in detail, a flat plate part 20 that is supported, so as to oscillate freely, at the center of a rotation supporting pin 19 (indicated in (a) and (b) of FIGS. 9 to 12), a cam latch part 21 that is greatly forward protruded from one side of the upper end of the flat plate part 20, and a locking latch part 22 (shown in FIG. 3) that is slightly protruded from the lower position of the cam latch part 21 of the flat plate part 20. The holding lever 12 is shifted between a standby position (position of (a) or (b) of FIGS. 9 to 11) that allows the lock member 11 to move and a holding position (position of (a) or (b) of FIG. 12) in which the locking latch part 22 is latched with the lever latch protrusion 16 of the lock member 11 and in which the movement of the lock member 11 to the lock position side is prevented. To a rotation supporting pin 19 is held a coil spring 23 serving as a second spring (indicated in FIG. 3, etc) and the lever member 11 is urged by the coil spring 23 in a direction in which the lever member 11 presses the second cam member 10.

Next, a detection means for detecting the positions of the lock member 11 and the holding lever 12 will be described. The position detecting means of the lock member 11 includes a detected part 24 serving as a first detected part that is integrally placed and protrudes from the first cam member 9, and a first position sensor S1 and a second position sensor S2 that are fixed to a circuit substrate 13, the circuit substrate being placed in a close position of and is opposite to the detected part 24. The detected part 24 is placed in a circular arc form on the same circumference with the rotation axis of the worm wheel 8 set at the center. The first position sensor S1 is set so as to be made ON at the rotation position of the first cam member 9 that causes the lock member 11 to position at a lock position and the second position sensor S2 is set so as to be made ON at the rotation position of the first cam member 9 that causes the lock member 11 to position at an unlock position. In further detail, the cam face of the first cam member 9 is divided into a lock position area (lower dead point) that renders the lock member 11 to a lock position, an unlock position area (upper dead point) that renders the lock member 11 to an unlock position, and an up and down area therebetween, and it is set such that the first position sensor S1 is ON at a desired position of the lock position area and that the second position sensor S2 is ON at a desired position of the unlock position area. Each of the desired positions is determined in consideration of the stable stroke of the lock member 11, the strength of the first cam member 9, the load torque at start-up of the motor 6, and the like.

A position detection means of the holding lever 12 includes a detected part 25 serving as a second detected part that is protruded slightly forward from the other end of the upper end of a flat plate part 20 of the holding lever 12 and a third position sensor S3 that is fixed to the position of the circuit substrate 13 adjacent to the detected part 25. The third position sensor S3 is OFF when the holding lever 12 is positioned at a standby position, and ON when the holding lever 12 is positioned at a holding position.

Next, the action of the electric steering lock device according to an embodiment of the present invention will be set forth. In a lock position of the lock member 11 indicated in FIGS. 5(a) and 5(b), the shaft latch protrusion 17 of the lock member 11 is latched with a steering shaft 30 and the rotation of the steering shaft 30 is prevented thereby. At this lock position, outputs are: an ON signal from the first position sensor S1; an OFF signal from the second position sensor S2; and an OFF signal from the output of the third position sensor S3.

A driver or the like presses a steering lock-unlock button (not shown) in order to drive a vehicle in this lock state. Then, first, it is confirmed that the position is at the lock position by the output state of each of the position sensors S1, S2 and S3. After this position confirmation, driving the motor 6 rotates the worm wheel 8 in an unlock direction A, and the lock member 11 follows the first cam member, 9 to move to an unlock position side (see (a) and (b) of FIGS. 6 and 7). The output of the first position sensor S1 changes its ON signal to an OFF signal at a position in which the first cam member 9 slightly rotates. Regardless of this signal change, the motor 6 is made to continue to be driven. Subsequently, as shown in FIGS. 8(a) and 8(b), when the lock member 11 is moved to the unlock position, the output of the second position sensor S2 changes its OFF signal to an ON signal. This signal change stops the drive of the motor 6. As a result, as shown in FIGS. 8(a) and 8(b), the lock member 11 is made to stop at an unlock position.

On the other hand, as indicated in FIGS. 9(a) and 9(b), in a lock position, the holding lever 12 positions at a standby position. Then, when the drive of the above described motor 6 rotates the worm wheel 8 in the unlock direction A, the holding lever 12 slides on the second cam position 10. The holding lever 12 positions at a standby position immediately prior to locating at the unlock position of the lock member 11 (refer to (a) and (b) of FIGS. 10 and 11). Thereafter, as illustrated in FIGS. 12(a) and 12(b), at the time when the lock member 11 moves to the unlock position, first, the holding lever moves from the standby position to the holding position. When the holding lever 12 moves to the holding position, the locking latch part 22 of the holding lever 12 is latched with the lever latch protrusion 16 of the lock member 11. Subsequently, the output of the third position sensor S3 changes its OFF signal to an ON signal. As a result, the action to the unlock position completes. When the lock member 11 positions at the unlock position, a steering shaft 30 freely rotates. In addition, the position of the lock member 11 is held by the holding lever 12, so the lock member 11 does not move to the lock position side even though a strong impact force is applied to the lock member 11. This can securely prevent a situation in which the steering shaft 30 is locked during the traveling of the vehicle, or the like.

Although the lock member 11 is at the unlock position, a driver or the like presses a steering lock-unlock button (not shown) in order to park the vehicle or the like. Then, first, whether or not the output of the first position sensor S1 is an OFF signal, the output of the second position sensor S2 is an ON signal, and the output of the third position sensor S3 is an ON signal are checked and the lock member 11 is confirmed to be positioned at the unlock position. After position confirmation, the worm wheel is rotated in a lock direction B by the drive of the motor 6 and the holding lever 12 follows the second cam member 10 to immediately move from the holding position to the standby position. This causes the output of the third position sensor S3 to change its ON signal to an OFF signal. Although the holding lever 12 shifted to the standby position slides on the second cam member 10, as shown in (a) and (b) of each of FIGS. 11 to 9, even if the holding lever 12 moves to the lock position, it continues to position at the standby position.

Figure 6:
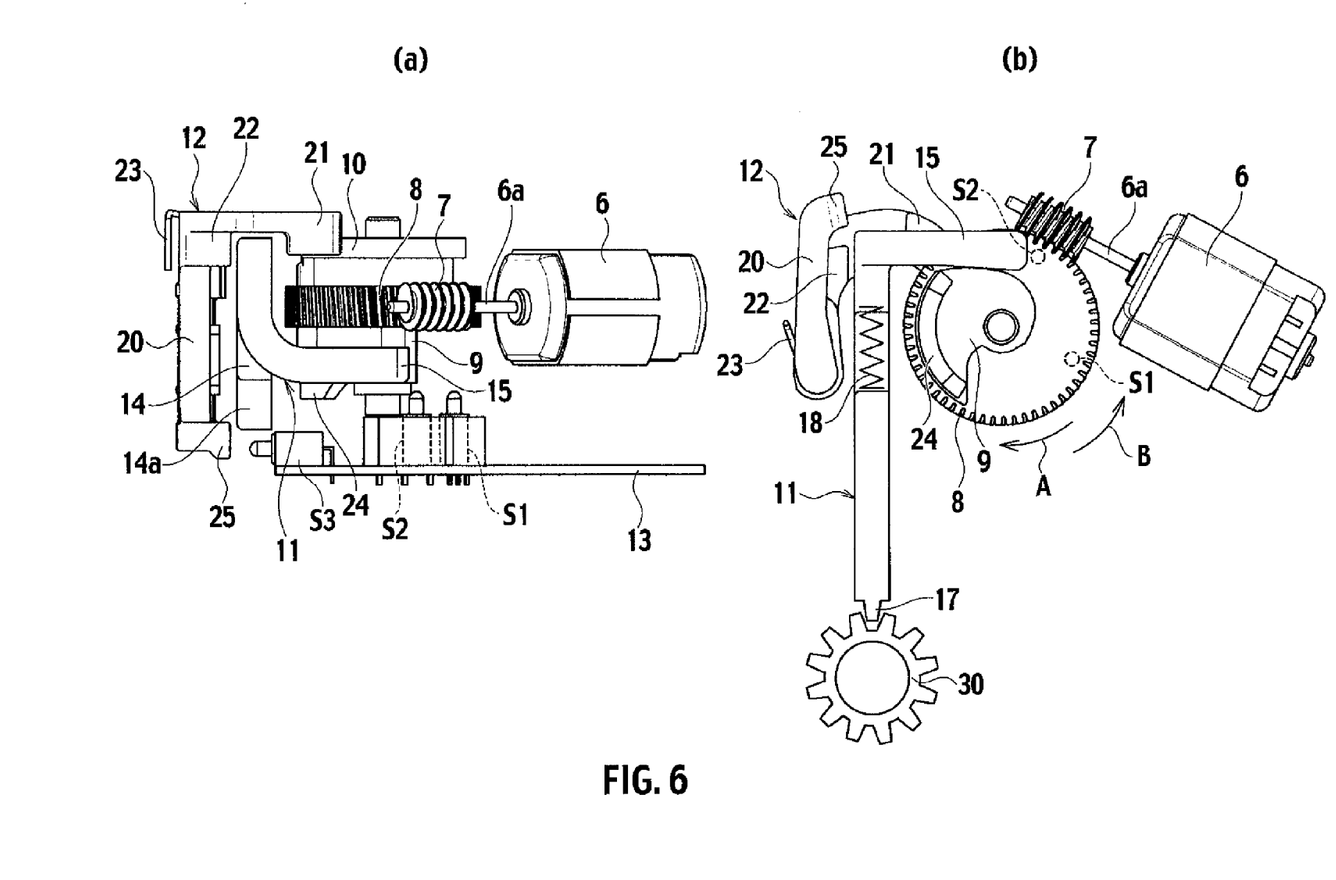
FIG. 6(a) is an action depiction diagram viewed in the U arrow direction of an electric steering lock device according to an embodiment of the present invention.
FIG. 6(b) is an action depiction diagram viewed in the L arrow direction of an electric steering lock device according to an embodiment of the present invention.
Figure 7:
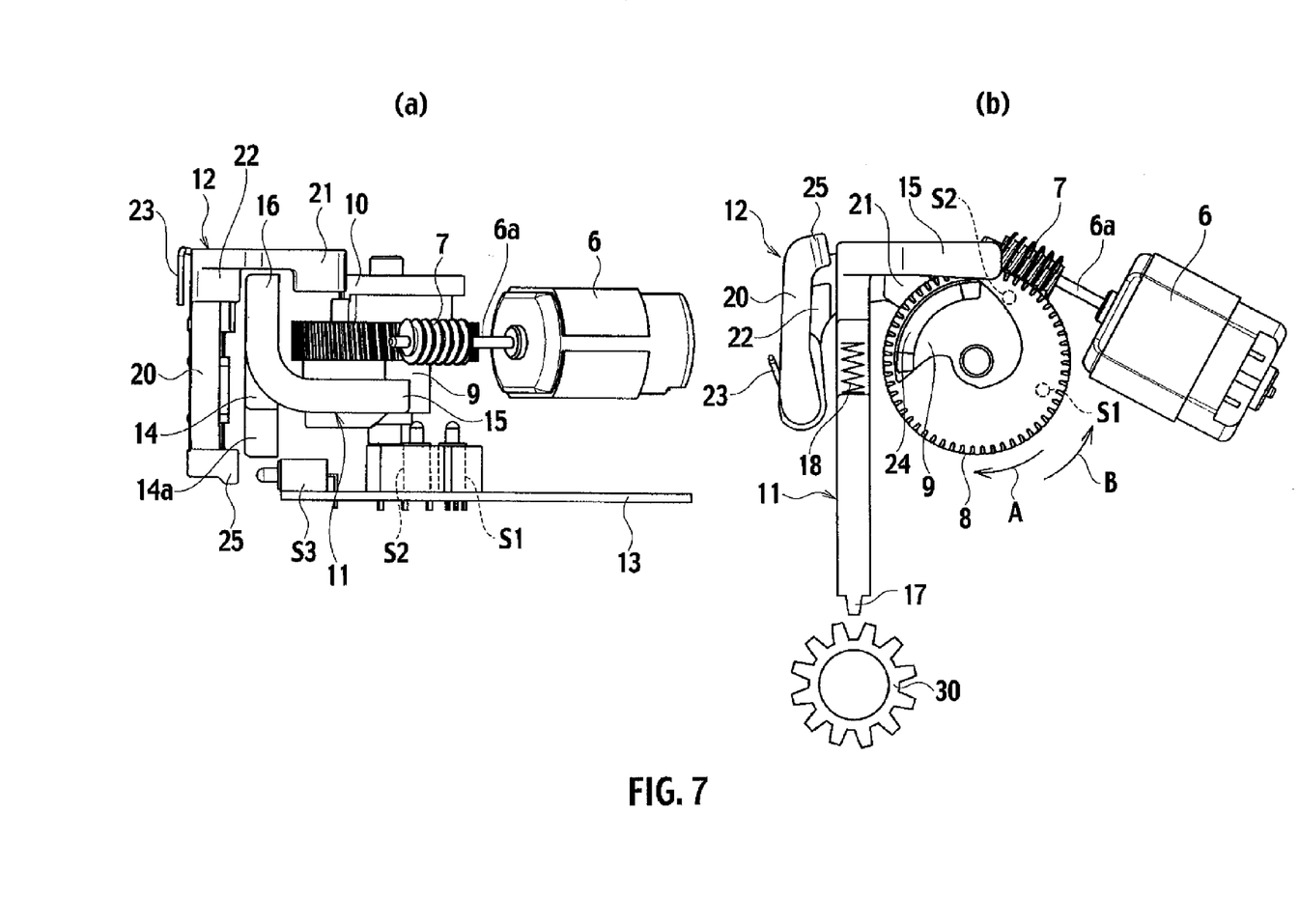
FIG. 7(a) is an action depiction diagram viewed in the U arrow direction of an electric steering lock device according to an embodiment of the present invention.
FIG. 7(b) is an action depiction diagram viewed in the L arrow direction of an electric steering lock device according to an embodiment of the present invention.
Figure 8:
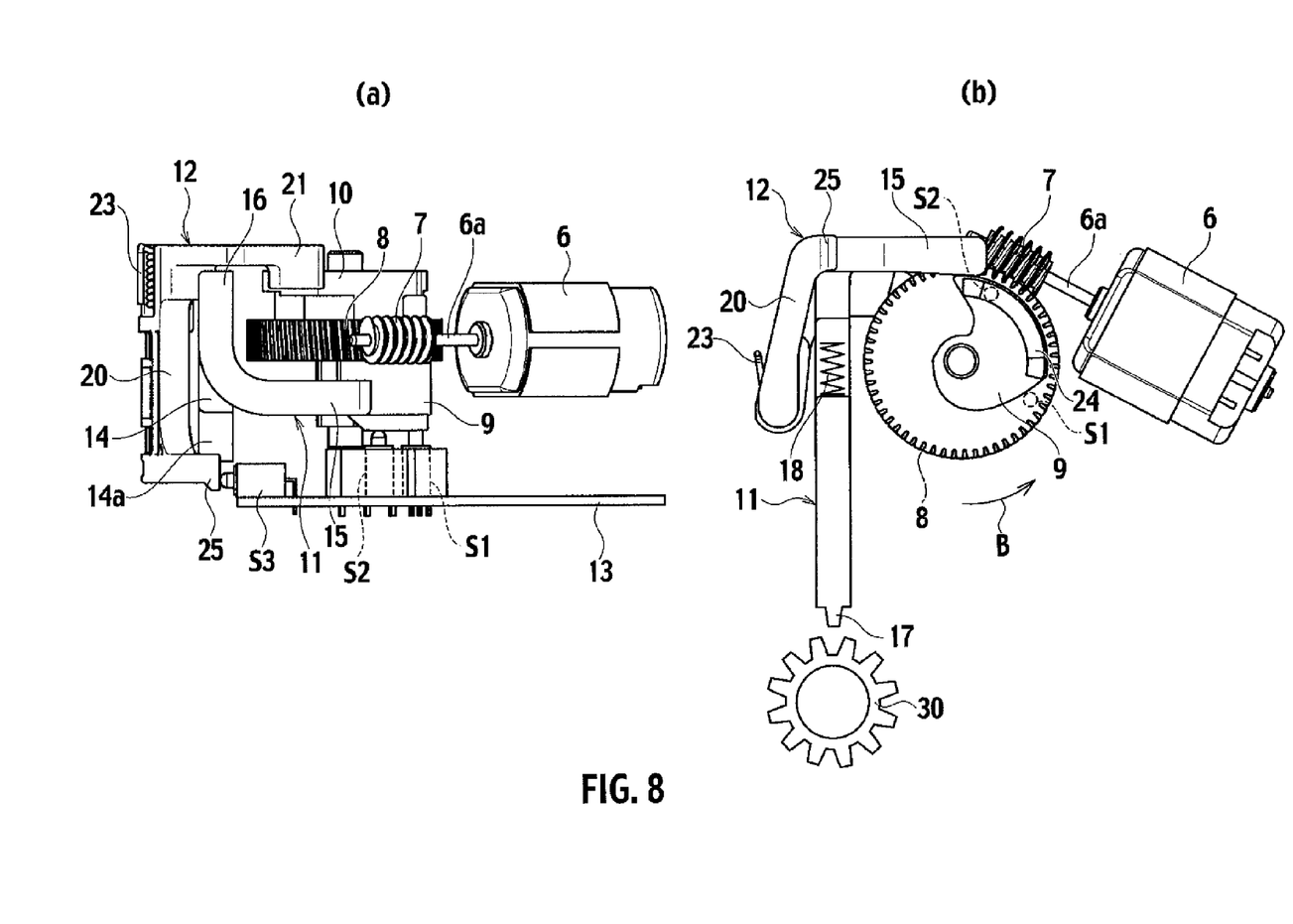
FIG. 8(a) is an action depiction diagram viewed in the U arrow direction of an electric steering lock device according to an embodiment of the present invention.
FIG. 8(b) is an action depiction diagram viewed in the L arrow direction of an electric steering lock device according to an embodiment of the present invention.
Figure 9:
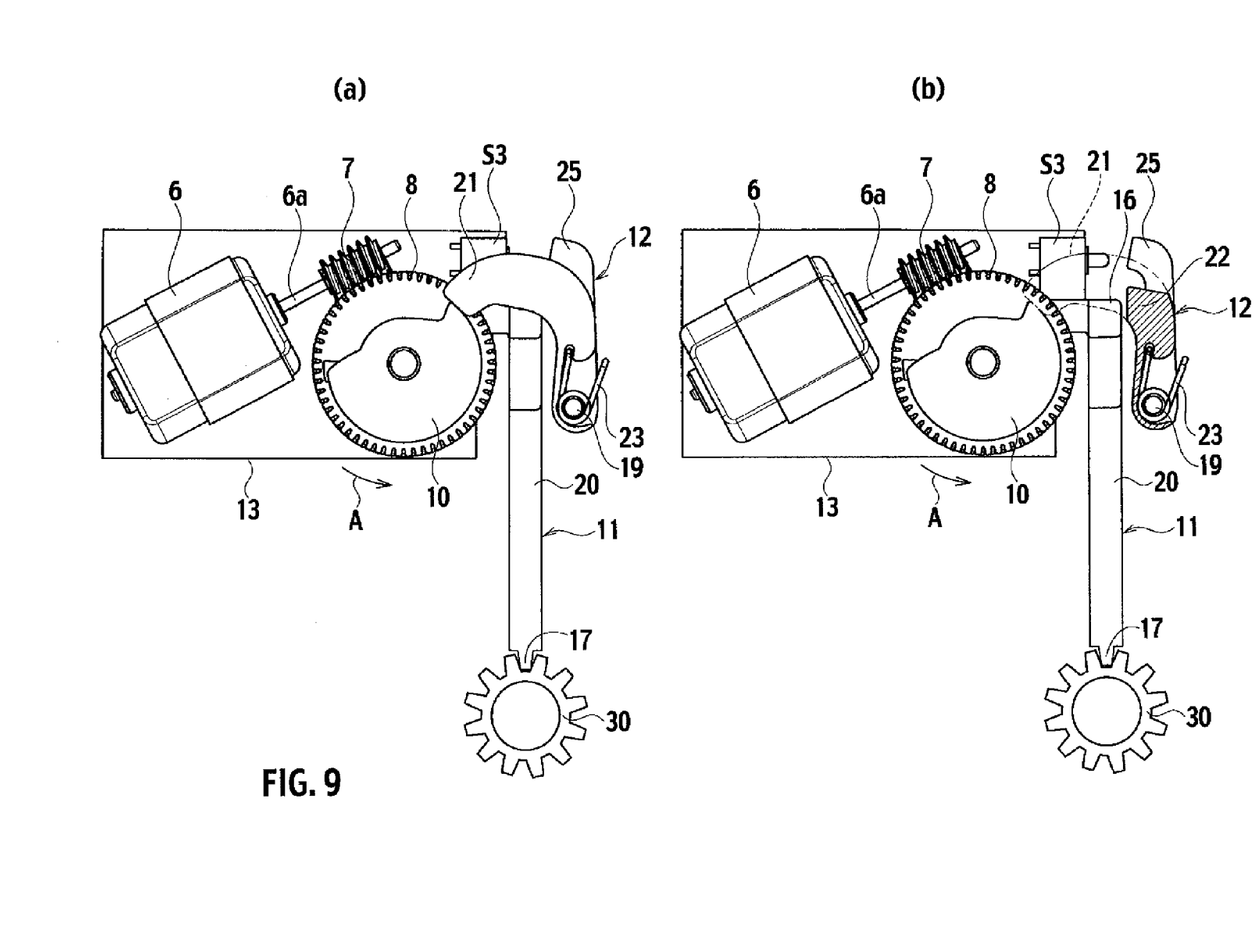
FIG. 9(a) is an action depiction diagram viewed in the R arrow direction of an electric steering lock device according to an embodiment of the present invention.
FIG. 9(b) is an action depiction diagram, partially cut away and viewed in the R arrow direction of an electric steering lock device according to an embodiment of the present invention.
Figure 10:
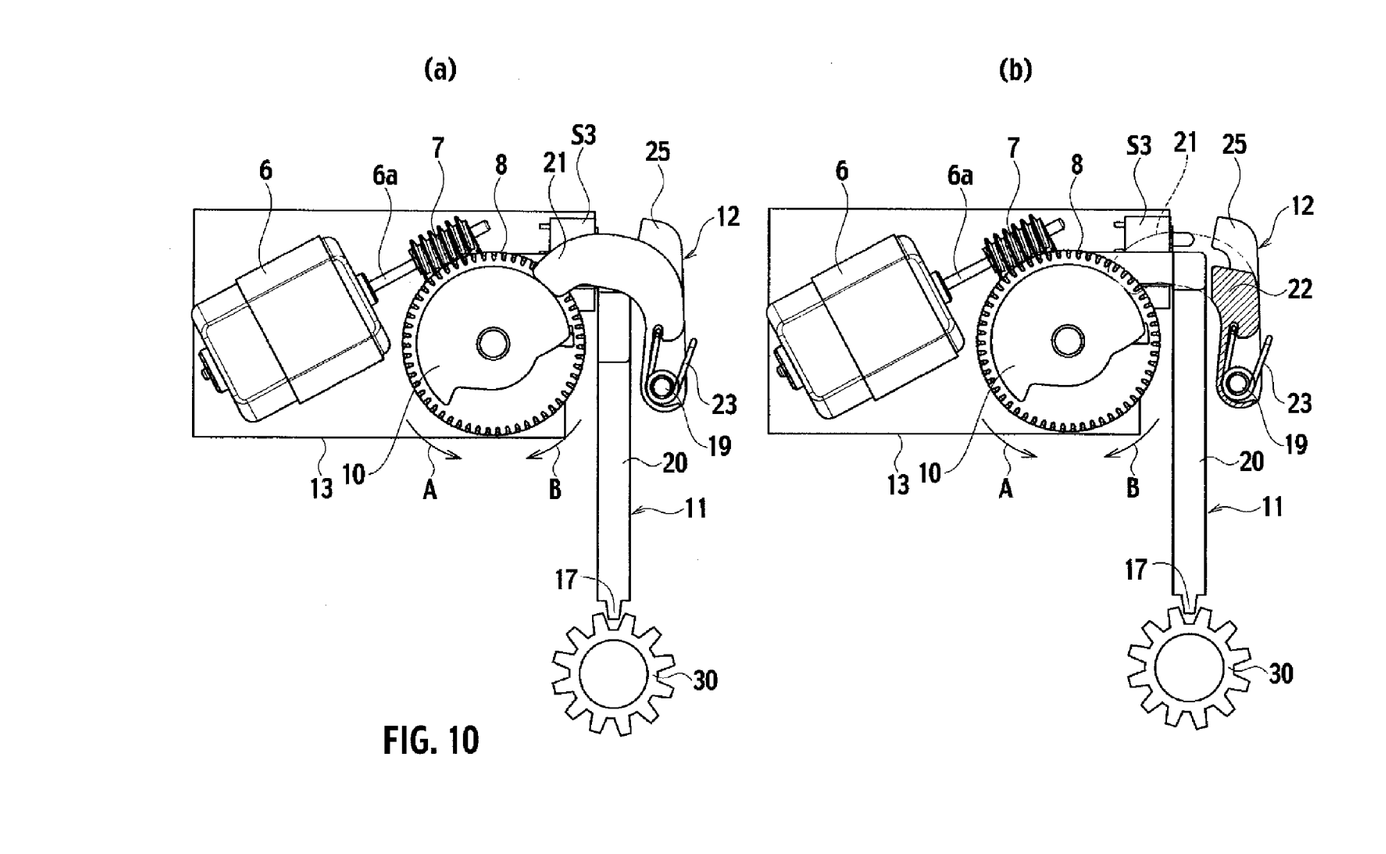
FIG. 10(a) is an action depiction diagram viewed in the R arrow direction of an electric steering lock device according to an embodiment of the present invention.
FIG. 10(b) is an action depiction diagram, partially cut away and viewed in the R arrow direction of an electric steering lock device according to an embodiment of the present invention.
Figure 11:
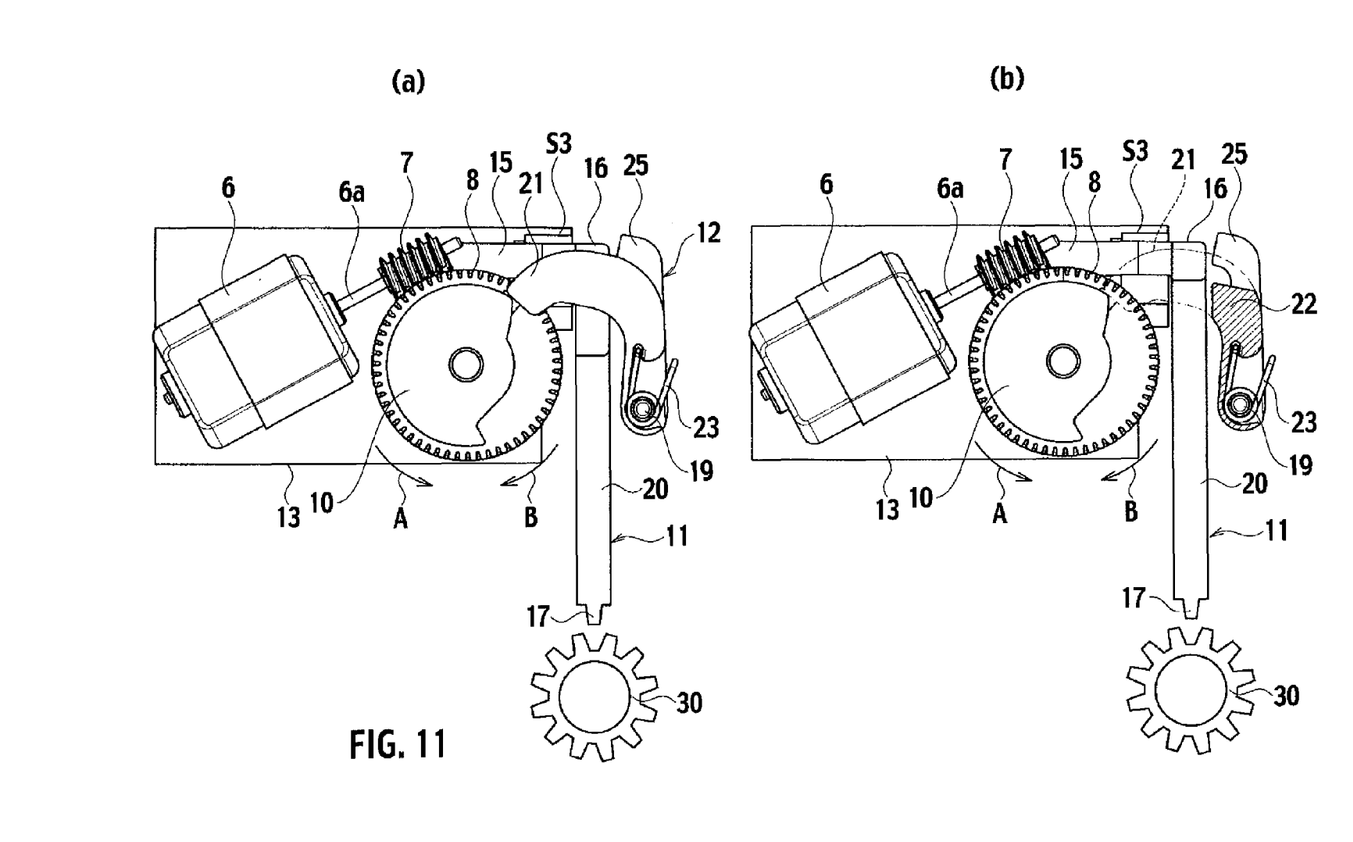
FIG. 11(a) is an action depiction diagram viewed in the R arrow direction of an electric steering lock device according to an embodiment of the present invention.
FIG. 11(b) is an action depiction diagram, partially cut away and viewed in the R arrow direction of an electric steering lock device according to an embodiment of the present invention.
Figure 12:
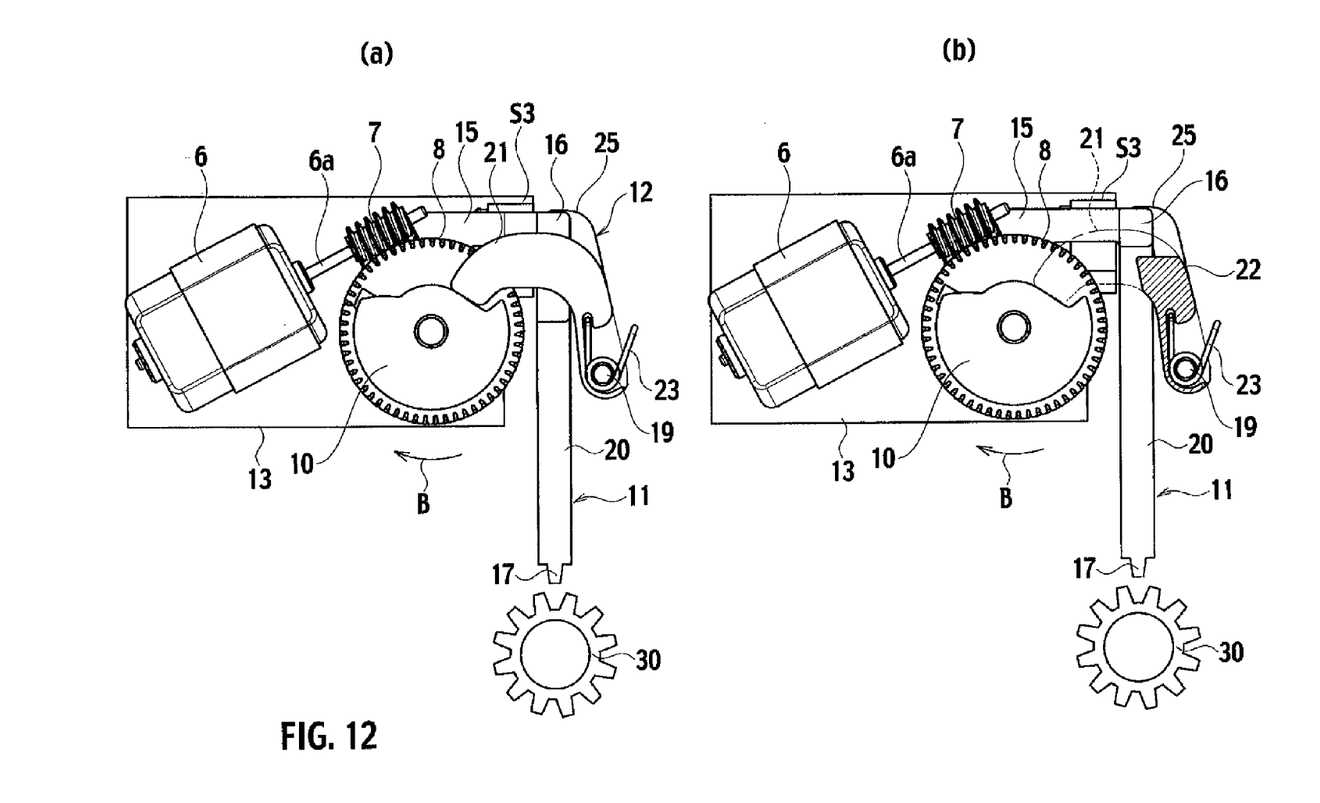
FIG. 12(a) is an action depiction diagram viewed in the R arrow direction of an electric steering lock device according to an embodiment of the present invention.

On the other hand, when the worm wheel 8 is rotated by the drive of the motor 6 in the lock direction B, the lock member 11 is shifted to the standby position of the holding lever 12 and then follows the first cam member 9 to the unlock position side (refer to (a) and (b) of FIGS. 7 to 6). The output of the second position sensor S2 changes its ON signal to OFF signal at a position in which the first cam member 9 slightly rotates. After this signal change also, the drive of the motor 6 continues and the lock member 11 moves to the unlock position. Then, the output of the first position sensor changes its OFF signal to an ON signal. This signal change stops the drive of the motor 6 and, as shown in FIGS. 5(a) and 5(b), the lock member 11 stops at the lock position. When the lock member 11 positions at the lock position, the rotation of the steering shaft 30 is locked. This can prevent vehicle robbery while the vehicle is parked.

As a result, the embodiment of the present invention is constituted in such a manner that the detected part 24 is disposed in the first cam member 9, the first and second position sensors S1, S2 for regarding the detected part 24 as a detection target are disposed, and the detection outputs of the first and second position sensors S1, S2 detect the lock position and the unlock position of the lock member 11, offering the following advantages. When the cam face of the first cam member 9 is divided into the lock position area that makes the lock member 11 be positioned at the lock position, the unlock position area that makes it be positioned at the unlock position and the up and down area therebetween, the lock member can be stopped at desired contact positions of the lock position area and the unlock area. Therefore, the lock member 11 can be stopped at a position in consideration of a stable stroke of the lock member 11, the strength of the first cam member 9, load torque at startup of the motor 6, and the like.

Disposition of the detected part 24 for detecting a lock position and an unlock position in the first cam member 9 enables the first position sensor S1 and the second position sensor S2 to be positioned in adjacent positions, thereby being capable of compactifying the electric steering lock device 1.

In the present embodiment, the detected part 25 is disposed in the holding lever 12, the third position sensor S3 that regards the detected part 25 as a detection target is disposed, and the detection results of the third position sensor S3 leads to detecting if the holding lever 12 positions at the holding position or positions at the standby position. Thus, the first and second position sensors S1 and S2 detect the position of the lock member 11 and the third position sensor S3 also detects the position of the holding lever 12 and this makes it possible to detect an unusual situation in which the holding lever 12 positions at the holding position even though the lock member 11 does not position at the unlock position, or the holding lever 12 does not position at the holding position although the lock member 11 positions at the unlock position. Hence, an unusual action of the electric steering lock device 1 can be detected in detail.

In the present embodiment, since the lock member 11 and the holding lever 12 are disposed in the vicinity of the worm wheel 8 and in mutually adjacent positions, the lock member 11 and the holding lever 12 can be placed using a small space. This contributes to the compactification of the electric steering lock device 1.

In the present embodiment, the detected part 24 disposed in the first cam member 9 and the detected part 25 disposed in the holding lever 12 are both disposed in adjacent positions. Adjacent disposition of the detected part 24 and the detected part 25 makes it possible to dispose the first, second and third position sensors S1, S2 and S3 in the same circuit substrate 13. Since the first, second and third position sensors S1, S2 and S3 are disposed in the same circuit substrate 13, the first, second and third position sensors S1, S2 and S3 are readily installed. In addition, the three position sensors S1, S2 and S3 can be placed in a small space and this contributes to the compactification of the electric steering lock device 1.

In the present embodiment, the compression spring 18 and the coil spring 23 are disposed. The compression spring urges the lock member 11 in a direction in which the lock member is pressed to the first cam member 9, and the coil spring 23 urges the holding lever 12 in a direction in which the holding lever is pressed to the second cam member 10. Thus, if the lock member 11 and the holding lever 12 are simply made contact with the first cam member and the second cam member 10, respectively, the lock member 11 and the holding lever 12 follow the first cam member 9 and the second cam member 10 and move by each spring force, whereby the structure of the first cam member 9 and the second cam member 10 can be simplified.

As described above, although the present invention has been described by way of embodiment, the present invention is by no means limited thereto, and the structure of each part can be replaced by any structure having a similar function.

Industrial Applicability

It is possible to provide an electric steering lock device that can stop the lock member at a desired contact position of the lock position area or the unlock position area of the first cam member and also enables the device to be compactified.

The invention claimed is:

1. An electric steering lock device, comprising:
a driving source;
a rotator configured to rotate by a drive of the driving source in an unlock direction and in a lock direction, the rotator including a first cam member and a second cam member, the first cam member having a first detected part integrally formed on the first cam member to protrude from a side surface of the first cam member in a direction of a rotation axis of the first cam member;
a lock member configured to follow the first cam member and shift between a lock position and an unlock position, the lock member being configured to prevent a rotation of a steering shaft at the lock position and allow a rotation of the steering shaft at the unlock position;
a holding lever configured to follow the second cam member and oscillate between a standby position and a holding position, the holding lever being configured to allow a movement of the lock member at the standby position and prevent a movement of the lock member to the lock position at the holding position, the holding lever being configured to position at the standby position when the lock member positions at a position other than the unlock position and position at the holding position when the lock member positions at the unlock position; and
a first position sensor and a separate second position sensor regarding the first detected part as a detecting target, both adapted to directly detect the first detected part,
wherein, when the lock member positions at the lock position, the first position sensor outputs an ON signal and the second position sensor outputs an OFF signal, and
wherein if the lock member positions at the lock position or at the unlock position is detected with detection outputs of the first position sensor and the second position sensor.

2. The electric steering lock device according to claim 1, wherein the holding lever has a second detected part, further comprising:
a third position sensor regarding the second detected part as a detection target, wherein if the holding lever positions at the holding position or at the standby position is detected with a detection result of the third position sensor.

3. The electric steering lock device according to claim 2, wherein the lock member and the holding member are placed in a vicinity of the rotator and placed in mutually adjacent positions.

4. The electric steering lock device according to claim 3, wherein the first detected part and the second detected part are both placed in mutually adjacent positions, and the first position sensor, the second position sensor and the third position sensor are disposed in a same circuit substrate.

5. The electric steering lock device according to claim 1, further comprising:
a first spring configured to urge the lock member in a direction in which the lock member is pressed to the first cam member, and
a second spring configured to urge the holding lever in a direction in which the holding lever is pressed to the second cam member.

* * * * *